United States Patent [19]
Greeve et al.

[11] Patent Number: 5,708,548
[45] Date of Patent: Jan. 13, 1998

[54] PROTECTION DEVICE FOR A SPA PACK

[75] Inventors: Teunis Greeve; Bruce Miller, both of Alberta, Canada

[73] Assignee: Cascade Systems Inc., Edmonton, Canada

[21] Appl. No.: 653,397

[22] Filed: May 24, 1996

[51] Int. Cl.[6] .................................................. H02H 3/00
[52] U.S. Cl. .................. 361/42; 340/652; 340/664; 4/504
[58] Field of Search ........................... 361/42, 45–50, 361/23–25, 28–34, 93; 340/635, 648, 652, 660, 662–664; 379/40; 4/493, 504

[56] References Cited

U.S. PATENT DOCUMENTS

| | | | |
|---|---|---|---|
| 3,598,917 | 8/1971 | De Raedt et al. | 379/49 |
| 4,763,365 | 8/1988 | Gerondale et al. | 4/542 |
| 5,220,478 | 6/1993 | Innes et al. | 361/93 |
| 5,388,144 | 2/1995 | Nichols | 379/40 |
| 5,559,720 | 9/1996 | Tompkins et al. | 364/505 |

*Primary Examiner*—Jeffrey A. Gaffin
*Assistant Examiner*—Michael Sherry
*Attorney, Agent, or Firm*—Anthony R. Lambert

[57] ABSTRACT

A protection device for a spa pack has a sensor and associated controller responsive to failure of the electrical circuits in the spa pack and a warning device responsive to operation of the controller to provide a warning of failure of the power supply for the spa pack. An automatic dialling system responsive to the controller provides automatic placement of a warning signal on a telephone line connected alarm system. The controller is connected within a circuit protected by a ground fault interrupter.

3 Claims, 1 Drawing Sheet

PROTECTION DEVICE FOR A SPA PACK

FIELD OF THE INVENTION

This invention relates to spas, particularly of the type known as hot tubs and used mainly outdoors.

BACKGROUND OF THE INVENTION

Spas usually include a spa pack that provides heat and water circulation for the spa. Loss of power to a spa during winter months can cause severe damage to the spa and to the spa pack due to freezing of water in the spa pack, spa and water circulation lines.

SUMMARY OF THE INVENTION

The inventor has identified the problem that the loss of power can cause, and provided a solution to this problem.

There is therefore provided in accordance with an aspect of the invention, a protection device for a spa pack of a spa. The protection device includes a sensor responsive to the electrical state of the spa pack, a controller responsive to the sensor and a warning device responsive to the controller to provide a warning upon operational failure of the spa pack.

The device may also include a ground fault circuit interrupter connected between the power supply and the spa pack, preferably connected between the controller and the spa pack.

An automatic dialling system responsive to the controller may provide automatic placement of a warning signal on a telephone line connected alarm system upon operational failure of the spa pack.

These and other aspects of the invention are described in the detailed description of the invention and claimed in the claims that follow.

BRIEF DESCRIPTION OF THE DRAWINGS

There will now be described preferred embodiment of the invention, with reference to the drawing, by way of illustration, in which the figure is an electronic schematic of an embodiment of the invention showing a controller, ground fault interrupter and spa pack according to the invention.

DETAILED DESCRIPTION OF A PREFERRED EMBODIMENT

Figure 1:
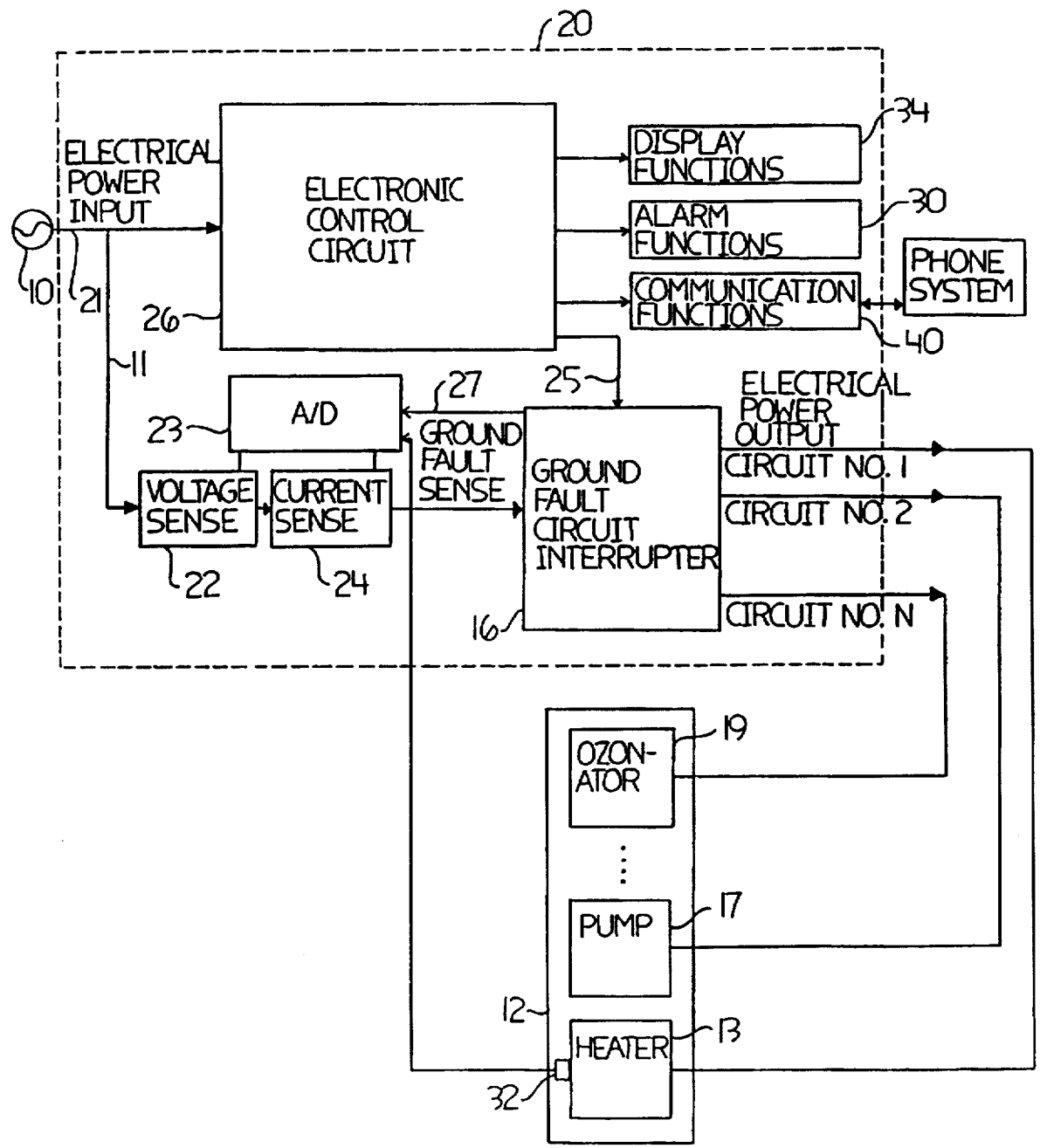

Referring to the figure, there is shown a power supply 10 for a spa pack 12 contained within a spa pack compartment of a spa (not shown). The power supply 10 is connected through an early warning system or spa pack protection system 20 that includes a ground fault circuit interrupter (GFCI) 16 on power line 11 leading to the spa pack 12. The GFCI 16 should interrupt the circuits 1–N to the loads 13, 17 and 19 if the fault current is 5 mA±1 mA on any of the circuits. Fault currents below 4 mA should not cause the circuits to open. National standards, for example as supplied by Underwriters Laboratories, applying to the GFCI should be consulted and adhered to.

The protection device 20 is connected to the power supply 10 of the spa pack and monitors the power supply 10 by monitoring power carried by power line 11 with voltage sense 22 and current sense 24. The protection device 20 also includes a controller 26 connected to power supply 10 via line 21, that receives signals from current sense 24 and voltage sense 22 through channels of an analog/digital converter 23 that are indicative of the electrical state of the load, namely spa circuits in the spa pack 12 including a circuit including heater 13, a circuit including pump 17 and a circuit including ozonator 19. The current sensors used for current sense 24 are readily commercially available and have an analog output representative of the current in the line being monitored that is conditioned to match the input of the A/D converter 23. The voltage sense 22 is primarily intended to indicate when the line voltage exceeds a factory set threshold level. A temperature sensor 32 in the spa pack 12, may also be used to send signals directly to the controller 26 and the controller 26 may be configured to open the GFCI 16 open sensing a temperature outside of a desired operational range. The controller 26 is connected by line 25 to supply control signals to GFCI 16 and receives monitoring signals from the GFCI 16 on line 27. The controller 26 may be any of several readily commercially available microprocessors programmed to carry out the functions described in this specification.

The controller 26 infers the state of the load from the voltage and current sense. Current and voltage measurements may be taken once per second. As an example, a complete failure of the spa pack may appear as an unexpected current decrease. Current should be sensed on both current carrying conductors of each electrical circuit supplying power to the spa pack. Current magnitudes are measured at specified intervals, then compared to overcurrent and undercurrent threshold values that are established for each spa pack electrical circuit. Upon sensing of a current exceeding the overcurrent threshold or is less than the undercurrent threshold, an alarm 30 or visual indicator 34 may be triggered. An audible alarm may for example be a piezoelectric alarm. The visual indicator may be for example an LED. An alarm circuit is provided for each circuit being monitored.

In the case of an undercurrent condition, with voltage low, it may be inferred that the GFCI 16 has tripped into the open circuit condition. The GFCI 16 then remains latched open until manually reset. Manual resetting of the GFCI 16 may be used to automatically restore the controller 26 to a monitoring condition. The GFCI 16 operates independently from the controller 26 in the sense that failure of the controller 26 must not affect operation of the GFCI 26.

The current states in any one line being monitored may be normal (CN), overcurrent (OC) or undercurrent (UC). The voltage states may be voltage present (VH) or voltage absent or insufficient (VL). Power on line 21 may also be monitored to give an indication of whether utility power is present (PU) and when it is absent (PD).

For any given circuit being monitored, the following states may occur (L1 and L2 are the two lines on any given circuit for one of the spa pack elements):

| Power | L1 | L2 | V12 | Comment |
| --- | --- | --- | --- | --- |
| PD | xx | xx | xx | Power out |
| PU | UC | UC | VL | GFCI Tripped |
| PU | UC | UC | VH | Open circuit, load side |
| PU | CN | CN | VL | Controller fault. |
| PU | CN | CN | VH | Normal operation |
| PU | OC | OC | VL | Controller fault or transient |
| PU | OC | OC | VH | Partial short or high overvoltage |

Other combinations, where the L1 and L2 show different values will not generate alarms but must be accounted for in the operation of the controller.

Each circuit being monitored will have its own state diagram. In addition, each alarm circuit has a similar state diagram corresponding to the state of the alarm.

When the pump 17 or heater 13 turns on, large currents may flow for seconds before the circuit reaches stable operation. A delay of 10 seconds should precede any overcurrent alarm. The delay is accumulative such that if the current decreases below the overcurrent threshold, a delay timer (not shown) in the controller 26 stops ticking for 4 seconds but retains the count value. If the overcurrent returns within 4 seconds, the timer restarts. After 10 seconds are accumulated on the timer, an overcurrent LED in the display system 34 and a fault LED are turned on. In addition, an audible alarm may be sounded. If the overcurrent does not return within 4 seconds, the timer resets to zero.

An undercurrent alarm is asserted immediately if an undercurrent condition is detected on the ozonator circuit. The pump and heater circuits must be treated differently because heaters and some circulating pumps can be cycled on and off for periods as long as 12 hours. The controller 26 is provided with a delay before any undercurrent alarm to account for the cycling period. The delay should be longer than the expected cycling period. After the delay period, the undercurrent LED for the heater or pump circuit is turned on and the fault LED turned on.

A simultaneous low voltage and undercurrent condition causes an LED to be turned on indicative of a breaker trip, and may cause an additional fault LED to be turned on. If a normal or overcurrent condition persists with a low voltage condition, Or there is both an undercurrent and overcurrent reading on the two lines of a 240 VAC circuit during normal voltage, then there is a possible fault in the controller. An LED in the display system 34 may be caused to flash to indicate a hardware failure.

Upon the occurrence of a fault occurring in a heater or pump for a preselected period, namely about 30 minutes, an autodialler 40 may be caused to automatically dial a security system through a private or public telephone system. A fault in the ozonator circuit should not activate the autodialler 40. The controller is provided with a reset function that clears all alarms in conventional manner, and has a conventional calibration circuit. Calibration values may be set when no faults are present. Values equal to 150% of the operating current magnitudes are written to a table of overcurrent thresholds, replacing any values obtained in a previous calibration.

The controller 26 may be provided with a battery backup in case of a loss of utility power.

The controller 26 may also send control signals on line 25 to the GFCI 16 to maintain one or more of the circuits 1–N closed while open circuiting any circuit with a ground fault. Ground fault current sensors (not shown) may sense the occurrence of a ground fault on one of the circuits 1–N and supply a signal along line 27 (line 27 is shown symbolically as a single line but may contain several one or two way communication channels) to the controller 26 through A/D converter 23 indicative of the presence of a ground fault. The occurrence of a ground fault may be signalled by turning on a breaker trip indicating LED in the display 34.

The occurrence of a ground fault, undercurrent or overcurrent condition is thus sensed and the controller 26 causes an audible signal to occur at alarm 30. The owner of the spa may then inspect the display 34 to determine where the fault has occurred.

A person skilled in the art could make immaterial modifications to the invention described and claimed in this patent without departing from the essence of the invention.

The embodiments of the invention in which an exclusive property or privilege is claimed are defined as follows:

1. A protection device for an operational spa pack of a spa, the spa pack having a power supply and an electrical state, the device comprising:

a sensor responsive to the electrical state of the spa pack;

a controller responsive to the sensor;

a ground fault circuit interrupter connected between the power supply and the spa pack; and a warning device responsive to the controller to provide a warning upon operational failure of the spa pack.

2. The protection device of claim 1 in which the ground fault circuit interrupter is connected between the controller and the spa pack.

3. The protection device of claim 2 further including:

an automatic dialling system responsive to the controller to provide automatic placement of a warning signal on a telephone line connected alarm system upon operational failure of the spa pack.

* * * * *